(No Model.)

J. F. THAYER.
HAMMOCK STICK.

No. 339,345. Patented Apr. 6, 1886.

WITNESSES:
Charles Hannigan
Frank B. Grater

INVENTOR:
James F. Thayer.
By Franklin A. Smith
ATT'Y.

UNITED STATES PATENT OFFICE.

JAMES F. THAYER, OF PROVIDENCE, RHODE ISLAND.

HAMMOCK-STICK.

SPECIFICATION forming part of Letters Patent No. 339,345, dated April 6, 1886.

Application filed February 23, 1884. Serial No. 121,778. (No model.)

*To all whom it may concern:*

Be it known that I, JAMES F. THAYER, a citizen of the United States, residing at Providence, in the county of Providence and State of Rhode Island, have invented certain new and useful Improvements in Hammock-Sticks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in hammock-sticks; and it consists of a hammock stick or spreader made in sections, each section being provided with suitable means for uniting and retaining the sections together and holding them in position while in use, the spreader being further provided with rings or staples for holding and retaining it to the cords of a hammock.

Heretofore hammocks have been provided with spreaders consisting of a single piece or block of wood or other suitable material, usually made of a concavo-convex form, the convex side being provided with a series of notches cut therein for retaining the cords of the hammock, the spreaders being removed when it is desired to stow the hammock away.

My invention has for its object to provide hammock sticks or spreaders designed for spreading or distending a hammock, retaining it in position while in use, and allowing the hammock to be folded into a compact form when desired to stow away without removing the spreaders from the hammock.

Figure 1:
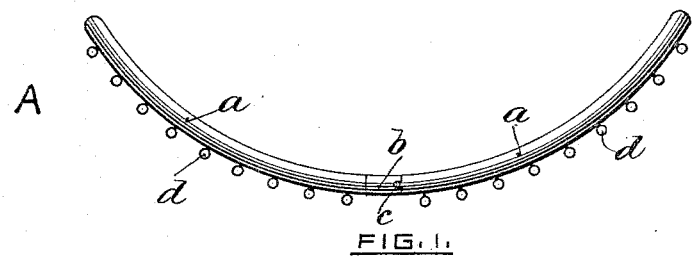
Figure 2:
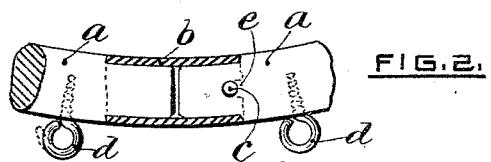
Figure 4:
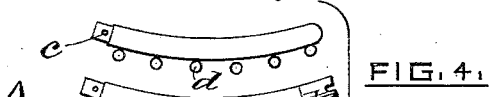
Figure 3:
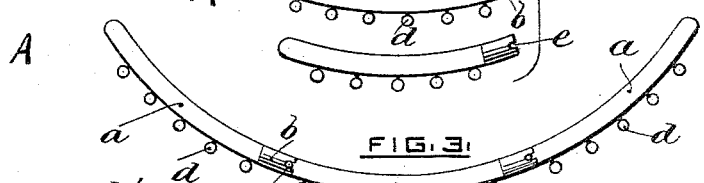
Figure 5:
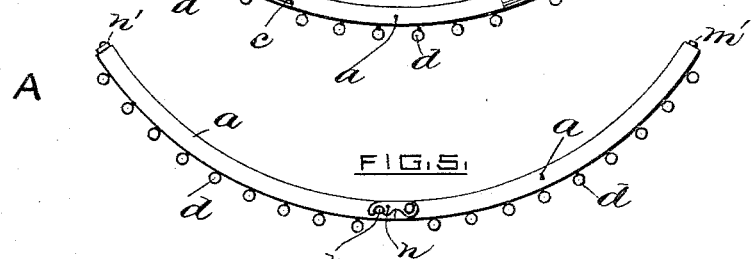
Figure 6:
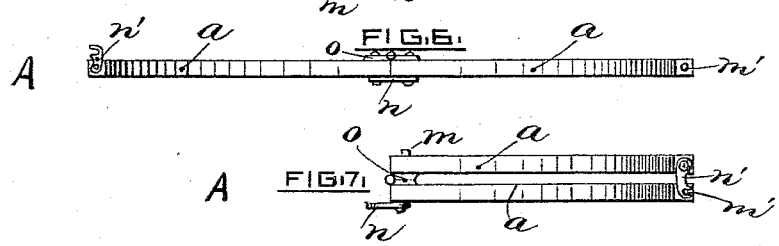
Figure 7:
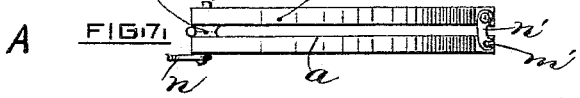
Figure 8:
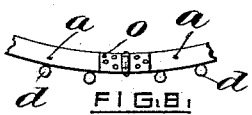

To illustrate my invention I refer to the drawings, in which Figure 1 is a side view of a hammock stick or spreader composed of two sections. Fig. 2 is an enlarged view of the joint in partial section. Fig. 3 is a side view of a spreader composed of three sections. Fig. 4 is a view of the same when detached. Fig. 5 is a side view of a hinged spreader. Fig. 6 is a top view of the same, showing the locking device complete. Fig. 7 is a top view of same when folded. Fig. 8 is a partial back view showing the hinge-joint.

In carrying out my invention the spreader is made in sections, either from separate pieces, or a spreader already in use may be cut transversely into sections. The spreader shown in Fig. 1 is made in two sections, $a$, the inner end of one section being provided with a ferrule, $b$, which is secured thereto, the said ferrule $b$ being provided at its outer or free end with a slot, $e$, to receive the stud $c$ of the opposite section, said section being fitted or jointed snugly into the interior of the ferrule $b$. When the two sections are united, they form a perfect joint, as shown in Fig. 2, the stud $c$ preventing the two sections from turning, thereby keeping them in line with each other. The sections $a$ are further provided with a series of rings or staples, $d$, secured at distances corresponding in number to the cords of the hammock.

The ring $d$ (shown in Fig. 2) is an ordinary picture-ring, the end being bent outward, as shown in dotted lines in Fig. 2. After the cords of the hammock are passed into the rings the ends are closed, thus retaining the cords. I have shown and described this form of ring; but any equivalent form may be employed which attains the same result—namely, to retain the cords of the hammock in position on the spreader, so they will not become detached.

I have shown in the drawings spreaders composed of two and three sections, the number of which may be increased, if desired. The manner of securing the ends of the sections together may also be varied without departing from the spirit of my invention.

In Figs. 5 and 6 are views of a spreader made in two sections, the inner ends of each being secured together by means of a hinge, as fully shown in Fig. 8, which allows the spreader to be folded if desired to stow away, or expanded if designed to be used, the sections being provided, as before described, with the closed rings $d$.

When the spreader provided with the hinge is expanded, as shown in Figs. 5 and 6, the sections are secured from folding by means of the hook $n$ and pin $m$, as shown, and when folded to stow away, as shown in Fig. 7, the sections are held together by the hook $n'$ and pin $m'$, located on the outer end of the sections. I am thus enabled to furnish a hammock stick or spreader which can be readily attached to hammocks already in use, taking the place of the ordinary notched spreader, and when once attached to a hammock does not require to be removed in order to take the hammock down to fold and stow away.

My improved spreader is adapted to be secured to the hammock ready for sale as an entirety, making the hammock complete ready for use.

I am aware that hammock sticks or spreaders have been made before, but such have been made of one solid piece, having the disadvantages before described, and therefore I do not claim such construction, broadly.

As shown in the drawings and indicated in the specification, the rings securely retain the suspension-cords to the spreader or stick, while said cords are free to move longitudinally through the rings. Furthermore, I employ the word "rings" mainly to designate the screw-eye, staple, or other like means used to secure the suspension-cords to the spreader or its parts; but What I do claim, and desire to secure by Letters Patent, is—

1. A hammock stick or spreader severed transversely into sections and provided with fastenings to endwise connect said sections, for the purpose specified.

2. A hammock stick or spreader consisting of transverse sections provided with fastenings to connect them together and having a series of rings for retaining the cords of a hammock to said sections, as specified.

3. A hammock stick or spreader consisting of transverse sections, the adjacent ends of said sections being provided one with a ferrule having a slot and the other with a stud to enter said slot, as specified.

4. A hammock stick or spreader consisting of detachable transverse sections, each having one or more rings to retain it to the suspension-cords of a hammock, as set forth.

5. A hammock stick or spreader made in detachable sections, as and for the purpose specified.

In testimony whereof I affix my signature in the presence of two witnesses.

JAMES F. THAYER.

Witnesses:
FRANKLIN A. SMITH, Jr.,
WM. R. DUTEMPLE.